July 2, 1968  E. HIRSCH  3,390,463

LIQUID-LEVEL GAUGE

Filed April 19, 1966  2 Sheets-Sheet 1

INVENTOR.
EDUARD HIRSCH
BY
*Friedman & Goodman*
ATTORNEYS

July 2, 1968            E. HIRSCH            3,390,463

LIQUID-LEVEL GAUGE

Filed April 19, 1966            2 Sheets-Sheet 2

INVENTOR.
EDUARD HIRSCH

BY Friedman + Goodman

ATTORNEYS

3,390,463
LIQUID-LEVEL GAUGE
Eduard Hirsch, Los Angeles, Calif., assignor of one-half to Margaret Hirsch, Los Angeles, Calif.
Filed Apr. 19, 1966, Ser. No. 543,599
2 Claims. (Cl. 33—126.4)

ABSTRACT OF THE DISCLOSURE

The invention contemplates a liquid-level gauge comprising in combination an inner transparent tube, an outer transparent tube, at least one of said tubes being provided with indicia on the face thereof adjacent the other of said transparent tubes communicating axially with the exterior of said gauge, and means for releasably closing an end of said inner transparent tube and thereby taking said inner transparent tube out of communication with the exterior of said gauge through said end of said inner tube.

---

This invention relates to a liquid level gauge. In particular, this invention relates to a liquid level gauge of the type comprising a tube adapted to be lowered into a reservoir, permitting the liquid in the tube to rise to the level of the liquid in the reservoir, and provided with means for closing the tube to prevent escape of liquid therefrom, so that the tube may be withdrawn from the reservoir and the level of liquid in the reservoir determined by observing the level of liquid in the tube.

Various types of liquid-level gauges have been proposed in the past. Among the most common of these have been the type employing a gauge glass or the like mounted externally of the reservoir, at a position such that the normal range of fluctuation of liquid level in the reservoir is encompassed within the vertical extent of the gauge glass. Under normal conditions (the gauge glass being in communication with the interior of the reservoir), the level of liquid in the gauge glass is substantially the same as the level of liquid in the reservoir, so that the level inside the reservoir can be determined by simple inspection of the level in the gauge glass. This system is simple, highly effective, and very popular, being used for example, on most home steam-heating plants, industrial boilers and the like. This type of indicator, however, suffers from certain disadvantages which preclude its use in many applications where it might otherwise be effective. Among the most important of these is that, in its simple form, it is a direct-reading, rather than a remote-reading instrument, and can be used only when it is possible to position the eye of the observer close to the outer wall of the reservoir, at a level close to that of the liquid within the reservoir. This in manifestly impossible or at least impractical in many situations, for example where the reservoir is a buried fuel-oil tank, service station gasoline supply tank or the like. This type of apparatus can be made remote-reading by the use of optical relay systems such as mirrors and telescopes, or electrically by the use of a metallic float combined with sensing means for determining and remotely indicating the position of the float, but such measures tend to make the indicator more expensive, complicated in construction, and frequently less reliable in operation. For these reasons, it is the usual practice, when it is not feasible to position the observer's eye close to the outer wall of the reservoir and near the liquid level, to resort to other indicating means.

Another common type of gauge means is exemplified by the gasoline gauges commonly used in automobiles. In such gauges, a sensing element is provided in the form of a float. The float is mounted in the fuel tank or other reservoir, usually mounted on the end of a suitable arm, the arm being pivotally connected to a fixed member, so that the height of the liquid is indicated by the level of the float, and consequently the angular position of the arm on which it is mounted. Suitable means are provided for sensing the position of the arm and converting the information so sensed to the form of an electrical signal, which may be transmitted through suitable conductors to an appropriate read-out means such as a dashboard, fuel-gauge instrument or the like. This type of liquid-level gauge is also practical, efficient and popular, as evidenced by its wide acceptance in the automotive industry, to mention but one familiar example.

Nevertheless, this type of liquid level gauge also suffers from certain disadvantages, which limit its scope of application. It generally requires a fixed, permanent or semi-permanent installation, and thus cannot readily be transferred from one reservoir to another. In a practical sense, this means that where the levels in a number of tanks or other reservoirs are to be measured, there must be provided a permanent, fixedly installed liquid level gauge for each tank or other reservoir so to be measured. Also, this type of apparatus requires a number of fairly expensive components, and is subject to failure or error upon failure of any of the components. Moreover, this type of gauge generally depends for its effectiveness upon the presence of an available source of electricity of the proper voltage and other electrical characteristics to accommodate the requirements of the electrical components of the gauge.

Among the simplest of all means heretofore used for the determination of liquid levels in tanks and other reservoirs is the dip-stick, which is simply an elongated piece of wood, metal, or other suitable material which can be inserted into a tank, then withdrawn, and the liquid level in the tank determined by observing the height to which the liquid has wetted the dip-stick, and comparing this height with a suitable calibration, which may be, for example, in the form of an external chart, or in the form of indicia scribed, imprinted, or otherwise applied to the dip-stick itself.

Notwithstanding the simplicity, economy, and ease of operation which constitute the principal advantages of the dip-stick, it too suffers from certain disadvantages. For one thing, although it is capable of measuring the level of liquid in the reservoir, it ordinarily is incapable of distinguishing between one liquid and another (for example, water and gasoline), and gives no indication of the character of the liquid (for example, whether clear and clean or turbid and dirty) other than what can be deduced from the appearance of the thin film of liquid adhering to the dip-stick upon withdrawal thereof from the reservoir. Moreover, if the indicia are not carried on the dip-stick itself, it is necessary to resort to other means, such as a ruler or the like, to measure the height to which the dip-stick has been wetted, and usually to third means, such as calibration chart, to convert the measured liquid height to a volume of liquid in the reservoir. On the other hand, if the indicia are placed directly on the dip-stick, there is a tendency for them to become indistinct or entirely obliterated in the course of time by normal abrasion and/or the solvent action of the liquids in the reservoirs.

An object of this invention, therefore, is to provide an improved liquid-level gauge.

Another object is to provide a liquid-level gauge susceptible of use under conditions where it is not practical to place the eye of the observer close to the exterior of the reservoir in which the liquid level is to be measured and near the horizontal level of the surface of the liquid contained therein.

Still another object is to provide a liquid-level gauge which can be made remote-reading, without necessitating complicated and expensive arrays of optical elements.

A further object is to provide a gauge of the type described, which does not require a fixed installation to be effective.

Yet another object is to provide a liquid-level gauge which can be transferred conveniently from one reservoir to another, and is therefore suitable for observation of the liquid levels in a plurality of reservoirs, using only a single measuring instrument.

Another object is to provide a liquid level gauge as aforesaid, which does not depend for its effectiveness on the availability of a supply of electrical energy.

Another object is to provide a device of the type described, which provides visual indication of the character of the liquid of which the level is being measured.

A further object is to provide a liquid level gauge capable of providing a sample of this liquid in the reservoir for analysis and/or physical testing and the like.

An additional object is to provide a liquid-level gauge as aforesaid, which does not require the use of additional external means for measuring the height of liquid in the reservoir as indicated by the wetting of an immersion element.

Still another object is to provide a liquid-level gauge provided with self-contained indicia, wherein said indicia are protected from abrasion and solvent action of the liquid of which the level is being measured.

A feature of the invention is the use of a pair of concentric, transparent tubes, the inner of said tubes having an orifice at one end thereof adapted to communicate with a body of liquid external of said tubes.

Another feature is the provision of a closure for the end of said inner tube, said closure being adapted to be put in an open condition prior to insertion of said tubes in the body of liquid of which the level is to be measured, and closed by contact with the bottom of a reservoir containing said liquid.

Another feature is the provision of means for preventing access of said liquid to the annular space between said tubes.

According to another feature of the invention, at least one of said concentric, transparent tubes is provided with indicia, said indicia being one the surface of said tube which faces the adjacent surface of the other of said tubes.

Another feature is the use of a spring-biased stopper for closing an end of the inner of said tubes, said spring bias being adapted to urge said stopper to a position such as to close said inner tube.

Still another feature is the use of releasable holding means for holding said stopper in open position against said spring bias.

Yet another feature is the use of such releasable holding means is adapted to hold said stopper in open position from prior to the introduction of said liquid-level gauge into said liquid, until after said gauge is immersed in said liquid.

According to another feature of the invention, said releasable holding means is adapted to be released, and thereby closed, by contact between a sensing member associated with said holding means and the bottom of said reservoir.

Another feature of the invention resides in the provision of a sensing member axially connected to said stopper, said sensing member-stopper assembly being provided with a radially enlarged portion, and an annular shoulder adapted to engage said radially enlarged portion, thereby holding said stopper in an open position.

A feature of a preferred embodiment of the invention is the provision of sleeve means adapted to abut said annular shoulder and present in combination with said annular shoulder a smooth internal profile, so as to prevent re-engagement of said enlarged portion of said sensing member-stopper assembly with said annular shoulder after disengagement thereof by contact of said assembly with the bottom of said reservoir.

Another feature is the provision of a spacing member between said concentric tubes, adapted to prevent contact of indicia on one of said tubes from coming in contact with the other of said tubes.

Another feature is the provision of an extension handle on said gauge, adapted to extend from an access opening adjacent the top of the reservoir to a point separated by no more than the length of the concentric tubes from the floor of the reservoir.

According to another feature of the invention, the extension handle is adapted to telescope into the inner of said concentric tubes.

An additional feature is the use of holding means for maintaining a predetermined axial adjustment of the position of said extension handle with respect to said concentric tubes.

Other objects, features and advantages will become apparent from the following more complete description and claims, and the accompanying drawings.

In one particularly desirable embodiment, this invention contemplates a liquid-level group comprising in combination an inner transparent tube, an outer transparent tube, at least one of said tubes being provided with indicia on the face thereof adjacent the other of said transparent tubes communicating axially with the exterior of said gauge, and means for releasably closing an end of said inner transparent tube and thereby taking said inner transparent tube out of communication with the exterior of said gauge through said end of said inner tube.

Referring now to the drawings.

Figure 1:
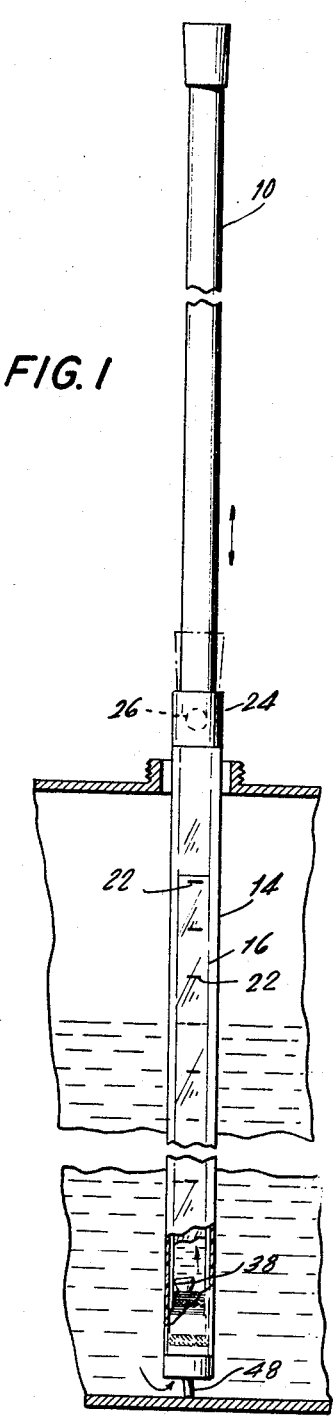
FIGURE 1 is an elevation, partly in section, of a liquid-level gauge according to one embodiment of the invention.
Figure 2:
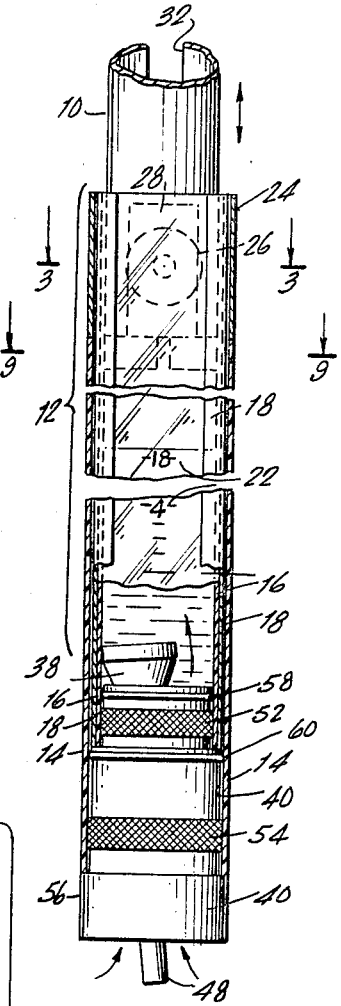
FIGURE 2 is an elevation, on a larger scale, also partly in section, showing certain additional details of construction of the embodiment of FIGURE 1.

Referring now more particularly to FIGURE 1, the apparatus of the invention comprises an extension handle 10 which may be of any desired length, depending on the size and location of the tank or other reservoir of which the contents are to be measured.

Figure 3:
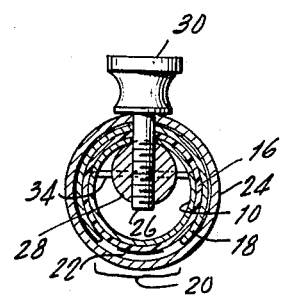
FIGURE 3 is a cross-section in plan, along the line 3—3 of FIGURE 2.

Attached to the lower end of handle 10 is a sighting section 12 comprising a pair of concentric transparent tubes, namely an outer tube 14 and an inner tube 16. A slotted cylindrical spacing member 18, preferably of metal, is interposed in the annular space between tube 14 and tube 16, leaving an open space as indicated at 20 (FIGURE 3) through which the level of liquid in the tubes may be observed. Indicia 22 are preferably provided in open space 20, so that the liquid level may be observed in a quantitative manner, without resorting to the use of external means such as rulers and the like. The indicia may be calibrated in linear measurements such as inches, which may then be converted to volume units or, providing the instrument is to be used with only one size and shape of tank, the indicia may be calibrated to read directly in terms of volume of liquid in the tank. The indicia may be applied to the interior of the outer transparent tube 14, but are preferably applied to the outer face of inner tube 16 as shown in FIGURE 3, for the reason that the outer tube, the main purpose of which is to protect the inner tube from abrasion and damage, will normally be replaced more frequently than the inner tube.

For ease of transportation and storage, and also to provide greater flexibility in use, the handle 10 is preferably so connected to the sighting section in such a way that it can be telescoped into the sighting section 12, by sliding into the interior of inner tube 16. To this end, the upper end of the sighting section is provided with a metal collar 24, flush with the upper end of outer tube 14 and embracing space 18. A screw 26 passes freely through a hole provided for the purpose in collar 24, and through a corresponding hole in space 18, between the opposed edges of a slot 32 provided for the purpose in handle 10, and is threaded into a suitable nut 28 preferably cylindrical in form, located within the upper end of inner tube 16. Screw 26 is provided with an enlarged, preferably knurled, head 30 by means of which it can be tightened and loosened by hand. When screw 26 is loosened, the handle 10 is free to slide into and out of inner tube 16, as indicated by the double arrow in FIGURE 1. When screw 26 is tightened by appropriate manipulation of head 30 thereof, cylindrical nut 28 is drawn toward head 30, and collar 24, spacer 18, inner tube 16 and the edges of slot 32 in handle 10 are all compressed together between nut 28 and screw head 30. This compression creates a sufficient frictional force to hold handle 10 in position with respect to the sighting section.

To prevent accidental disassembly of the gauge, handle 10 is preferably provided with cross members 34 near each end of the handle, in position to be intercepted by nut 28 and thus prevent further motion of the handle when it reaches the position of maximum extension (or the maximum collapsed condition, as the case may be).

Figure 4:
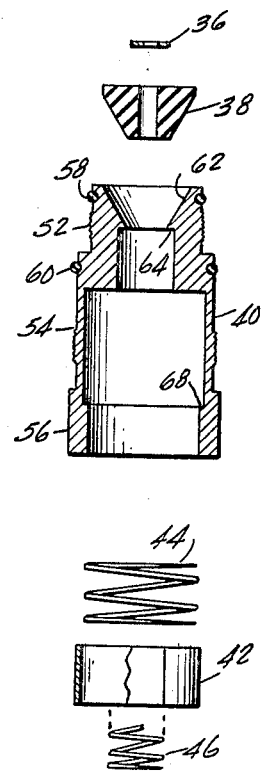
FIGURE 4 is an exploded elevation, showing further details of construction of the liquid-level gauge of FIGURES 1–3.
Figure 4:
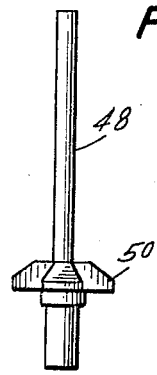

Attached to the lower end of the sighting section is a closure assembly, illustrated in exploded form in FIGURE 4. As shown in FIGURE 4, the closure assembly comprises a washer 36, a conical plug 38, a housing 40, a cylindrical spider-holder 42, a spider-holder spring 44, a plug spring 46, and a shaft 48 having formed thereon a spider-shaped lateral projection 50.

Figure 5:
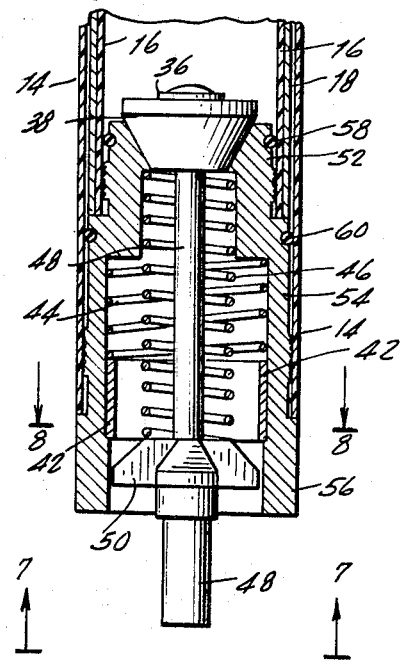
FIGURE 5 is a medial cross-section in elevation, on a still larger scale, showing the disposition of the internal components of the stopper means when the stopper is in operative condition to take the interior of the inner tube out of communication with the exterior of the gauge by way of the lower end of the inner tube.
Figure 6:
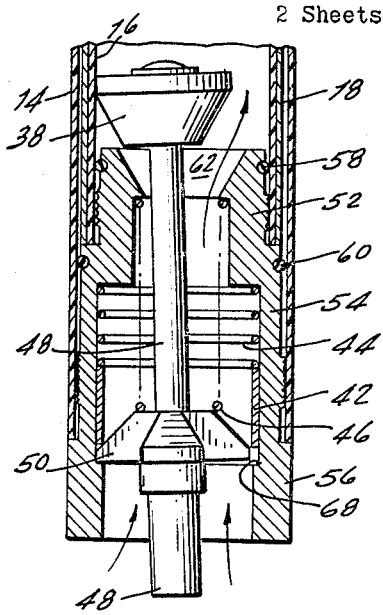
FIGURE 6 is a medial cross-section similar to FIGURE 5, showing the disposition of the internal components when the stopper means is in "cocked" position, leaving open a path of communication between the interior of the inner tube and the exterior of the gauge by way of the lower end of the inner tube.
Figure 7:
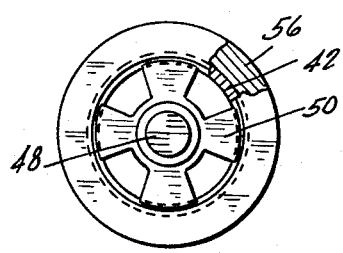
FIGURE 7 is an inverted plan view of the stopper assembly, taken along line 7—7 of FIGURE 5.
Figure 8:
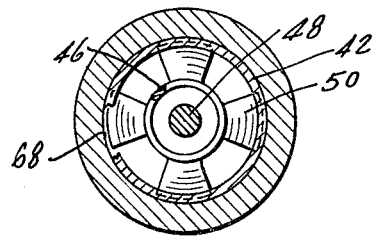
FIGURE 8 is a cross-sectional plan view of the stopper assembly, taken along line 8—8 of FIGURE 5.
Figure 9:
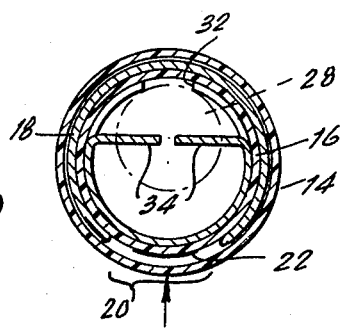
FIGURE 9 is a cross-sectional plan view of the gauge, taken along line 9—9 of FIGURE 2, but on a somewhat larger scale than that of FIGURE 2.

The closure assembly is assembled and connected to the lower ends of tubes 14 and 16 in the manner illustrated in FIGURES 5 and 6. It will be noted that housing 40 has three sections of differing diameters. The smallest diameter 52 is of a size to fit snugly into inner tube 16, forming a liquid-tight seal therewith by means of O-ring 58. Outer tube 14 extends beyond the lower end of inner tube 16, and the intermediate-diameter section 54 of housing 40 is sized to fit snugly within the projecting end of tube 14 forming a liquid-tight seal therewith by means of O-ring 60. The large-diameter portion 56 of housing 40 is substantially equal to the outside diameter of outer tube 14, forming a shoulder against which the end of tube 14 abuts, thereby holding tube 14 in proper position.

Internally, housing 40 has a conical seat 62 for plug 38, a shoulder 64 forming an abutment for the upper end of plug spring 46, a shoulder forming an abutment for the upper end of spider-holder spring 44 and an oppositely-facing shoulder 68 forming a seal for spider-holder 42.

The operation of the closure member is illustrated in FIGURES 5 and 6. To prepare the gauge for use, the lower end of shaft 48 is manually pushed upward and sideways, to force one of the projections of spider 50 in between shoulder 68 and spider-holder 42, as shown in FIGURE 6. In this position, plug spring 46 is under compression between shoulder 64 and spider 50, and is so retained by spider 50 resting on shoulder 68. Spider 50 is prevented from falling off shoulder 68 by the downward pressure exerted on it by spider-holder 42, which in turn is pressed down by spider-holder spring 44.

It will be noted that in this position, the plug 38, on the upper end of shaft 48, is held off its seat 62, allowing free flow of liquid up through the closure assembly and into tube 16, as indicated by the arrows, as the gauge is lowered into the reservoir. O-rings 58 and 60 cooperate to prevent access of liquid to the annular space between tubes 14 and 16, and hence protect the indicia located therein.

When the gauge reaches the bottom of the reservoir, the bottom of shaft 48 hits the floor thereof, lifting spider 50 off shoulder 68. Spring 44 then forces spider-holder 42 down onto shoulder 68, so that when the gauge is lifted, allowing spring 46 to force shaft 48 downward, the spider bypasses shoulder 68 (which is now occupied by spider-holder 42), and continues on down until its travel is halted by the action of plug 38 seating in its seat 62, as shown in FIGURE 5. The gauge is then withdrawn, and the liquid level therein is observed.

The gauge is emptied by simply pressing the end of shaft 48 against any rigid surface and allowing the liquid to run out.

While this invention has been described in terms of certain preferred embodiments and illustrated by way of certain drawings, these are illustrative only, as many alternatives and equivalents will readily occur to those skilled in the art, without departing from the spirit or proper scope of the invention. The invention is therefore, not to be construed as limited, except as set forth in the appended claims.

I claim:

1. A liquid-level gauge comprising in combination an inner transparent tube, an outer transparent tube, at least one of said tubes being provided with indicia on the face thereof adjacent the other of said transparent tubes, the interior of said inner tube communicating axially with the exterior of said gauge, means for releasably closing an end of said inner transparent tube and thereby taking said inner transparent tube out of communication with the exterior of said gauge through said end of said inner tube, said means for releasably closing said inner tube comprising a plug and a seat therefore, said plug and said seat being disposed within an end of said inner tube, resilient means for urging said plug to a closed position on said seat, shaft means connected to said plug and extending axially out of said inner tube, said shaft means being adapted to force said plug off said seat upon exertion of axial pressure on said shaft, said shaft means being provided with an enlarged portion, said apparatus further comprising means defining a shoulder associated with said inner tube, said shoulder being positioned to releasably hold said enlarged portion in a position such that said shaft holds said plug away from said seat.

2. Apparatus according to claim 1, further comprising means for holding said enlarged portion in contact with said shoulder until axial pressure is exerted upon said shaft to lift said enlarged portion off said shoulder, and thereafter preventing reseating of said enlarged portion on said shoulder.

References Cited

UNITED STATES PATENTS

| 980,320 | 1/1911 | Millea et al. | 33—126.4 |
| 2,534,644 | 12/1950 | Welch | 33—126.4 |

DAVID SCHONBERG, *Primary Examiner.*

J. W. ROSKOS, *Assistant Examiner.*